United States Patent
Lebahn

[11] 3,813,896
[45] June 4, 1974

[54] FREEZER AIR VENT
[75] Inventor: Arthur C. Lebahn, River Falls, Wis.
[73] Assignee: The Vollrath Co., Sheboygan, Wis.
[22] Filed: Jan. 26, 1973
[21] Appl. No.: 326,705

[52] U.S. Cl............ 62/409, 98/87, 98/119, 49/21, 62/410, 62/273, 62/275
[51] Int. Cl............................ F25d 17/04
[58] Field of Search......... 98/87, 119; 62/409, 410, 62/411, 412, 275; 49/21; 137/512

[56]  References Cited
UNITED STATES PATENTS

| | | | |
|---|---|---|---|
| 1,019,511 | 3/1912 | Miser | 137/512 |
| 1,270,961 | 7/1918 | Lippert | 137/512 |
| 1,601,308 | 9/1926 | Hill | 137/512 |
| 2,139,991 | 12/1938 | Wingard | 98/119 X |
| 2,774,116 | 12/1956 | Wolverton | 62/409 X |
| 2,798,422 | 7/1957 | Bourque | 62/409 X |
| 3,123,867 | 3/1964 | Combs | 62/409 X |
| 3,311,045 | 3/1967 | Costantini | 62/410 |
| 3,680,329 | 8/1972 | Burtis | 62/409 |
| 3,167,931 | 2/1965 | Bryson | 62/404 |

Primary Examiner—William J. Wye
Attorney, Agent, or Firm—Arthur L. Morsell, Jr.

[57] ABSTRACT

An air vent extends through one wall of a freezing chamber and communicates with the outside atmosphere through a vacuum relief valve and a pressure relief valve. When a partial vacuum condition develops within the freezing chamber due to the removal of airborne moisture by the freezing process, a vacuum-responsive element in the vacuum relief valve opens and admits atmospheric air into the freezing chamber to relieve the partial vacuum. When an increase of pressure develops within the freezing chamber due to the closing of the freezer door, a pressure-responsive element in the pressure relief valve opens to relieve the increase of pressure. A heater coil is wound around the interior of the air vent to prevent it from becoming clogged with ice.

8 Claims, 2 Drawing Figures

PATENTED JUN 4 1974 3,813,896

FREEZER AIR VENT

BACKGROUND OF THE INVENTION

This invention relates generally to freezing chambers and more particularly to walk-in freezers having a door through which material can be moved into and out of the freezing chamber. In such freezing chambers, a problem arises due to the fact that warm moist air enters the freezing chamber through the door every time some one enters or leaves the freezing chamber. After the door is closed, the moisture in this warm moist air is removed by the freezing process. This removal of moisture from the air causes a partial vacuum to develop within the freezing chamber, and the partial vacuum condition persists due to the fact that the freezing chamber is tightly sealed, particularly around the door, to block entry of warm outside air. This partial vacuum within the freezing chamber is a problem because most freezer doors open outwardly, whereby a reduced pressure on the inside of the door makes it hard to open due to the relatively higher pressure on the outside of the door.

A related problem arises in walk-in freezers due to the fact that they are well sealed to block entry of outside air. As a result, when the freezer door is being closed, and approaches its closed position, it compresses the air within the sealed freezing chamber, and this compressed air has no outlet except for the rapidly narrowing gap between the closing door and its frame. The pressure of the compressed air on the inside of the door makes it hard to close and may cause the door to bounce open before its latch engages.

SUMMARY OF THE INVENTION

In accordance with this invention, the above-noted problems are solved by providing an air vent which extends through one wall of the freezing chamber and communicates with the outside atmosphere through a vacuum relief valve and preferably also through a pressure relief valve. The vacuum relief valve has a vacuum-responsive valve element which opens in response to a partial vacuum in the freezing chamber and admits outside air to relieve the partial vacuum. The pressure relief valve has a pressure-responsive valve element which opens in response to an increase of pressure in the freezing chamber and allows escape of air from the chamber to relieve the increase of pressure. A heater coil is preferably wound around the interior of the air vent to prevent it from becoming clogged with ice.

DESCRIPTION OF THE PREFERRED EMBODIMENT

Figure 1:
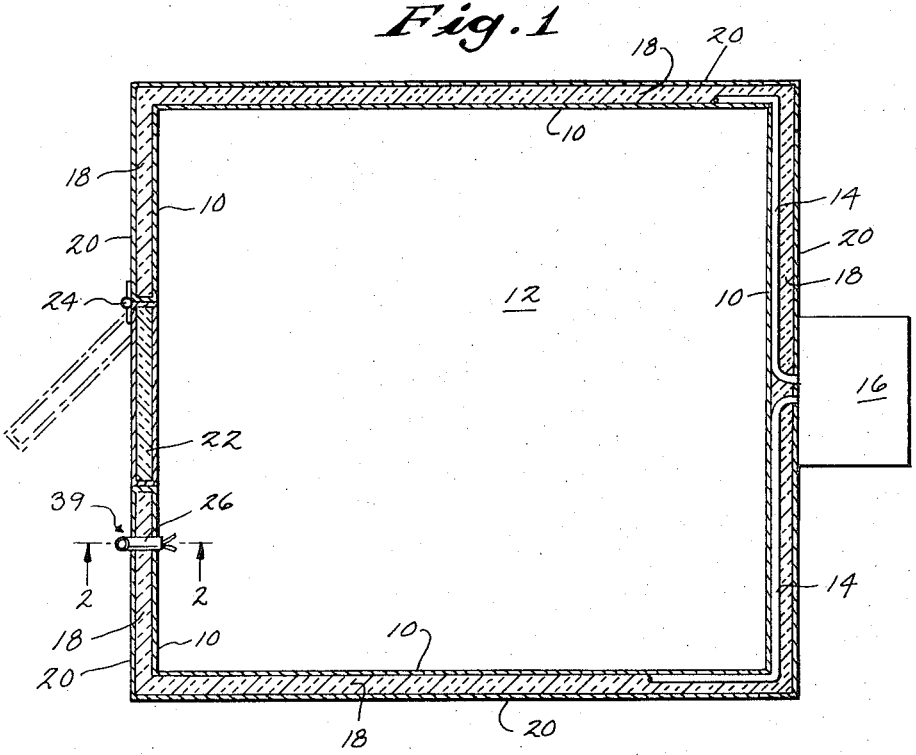
FIG. 1 is a plan view of a walk-in freezer equipped with one illustrative air vent of this invention.
Figure 2:
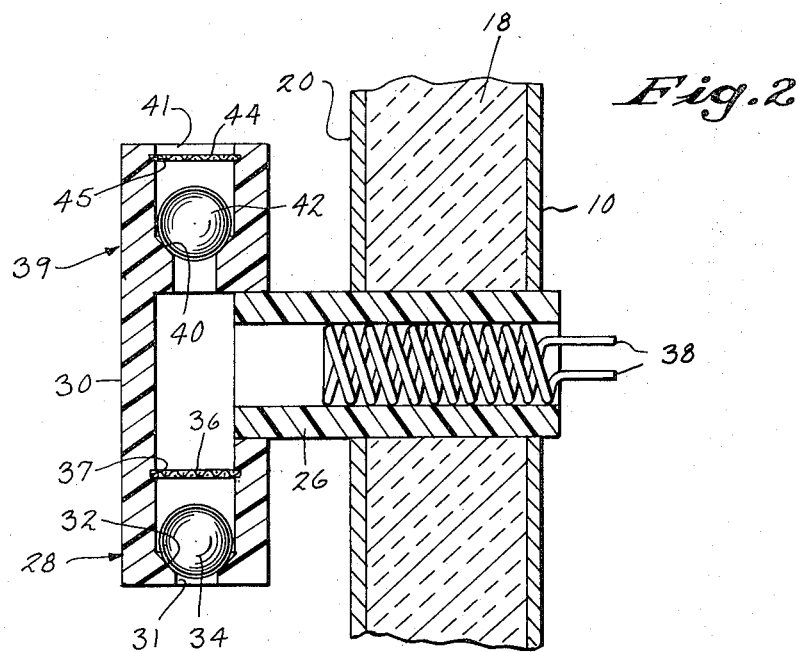
FIG. 2 is an enlarged longitudinal sectional view of the air vent shown in FIG. 1 taken along the line 2—2 of FIG. 1.

FIG. 1 is a plan view of a typical walk-in freezer unit having four air-impervious inner walls 10, and air-impervious floor 12, and an air-impervious ceiling (not shown) which form an enclosed, sealed freezing chamber 13. Freezing chamber 13 is cooled below freezing by refrigerating coils 14, which in turn are cooled by a suitable, prior art refrigerating unit 16. Insulating material 18 is packed between the inner walls 10 and outer walls 20 of freezing chamber 13. An insulated door 22 is mounted within an opening in one wall of the freezing chamber on suitable hinges 24 and opens outwardly as indicated by the dashed lines in FIG. 1. Suitable sealing lips (not shown) are provided around the door frame to effect an air-impervious seal around the door as is well known in the freezer art to block entry of warm outside air when the door is closed. When the door 22 is open, however, cold, heavy air flows out the bottom of the door opening and warm, moist air enters the freezer. The amount of warm, moist air that enters the freezing chamber depends on how long the door is left open.

After door 22 is closed, the moisture in this warm, moist air is removed by the refrigerating process. This produces a partial vacuum in freezing chamber 13 which persists because of the air-impervious inner walls 10 and the sealing around door 22. By lowering the pressure on the inside of door 22, this partial vacuum induces an inwardly-acting pressure differential across door 22 which makes it difficult to open. To relieve this partial vacuum, this invention provides an air vent 26 which extends through one wall of the freezing chamber and communicates with the outside atmosphere through a vacuum relief valve 28, which includes a hollow valve housing 30, an opening 31 at the bottom of valve housing 30, a circular valve seat 32 within the lower end of valve housing 30 above opening 31, a valve element such as a ping-pong ball 34 which fits loosely within valve housing 30 and is held in air-sealing relation with valve seat 32 by the force of gravity, and a copper screen 36 which is held within a groove 37 in housing 30 above ping-pong ball 34. When a partial vacuum forms within freezing chamber 13, the vacuum is communicated through air vent 26 and valve housing 30 to the top of ping-pong ball 34. This causes ping-pong ball 34 to lift, thus breaking the air seal around valve seat 32 and allowing air to enter freezing chamber 13 through valve housing 30 and air vent 26 to relieve the partial vacuum. The copper screen 36 prevents ping-pong ball 34 from being drawn into air vent 26. An electric heating coil 36 is preferably mounted within air vent 26 to prevent it from becoming clogged by a build-up of ice or frost. Electric heating coil 36 is energized via conductors 38 from a suitable electric outlet (not shown) within freezing chamber 13.

Although the vacuum-responsive valve element in this particular embodiment is ping-pong ball 34, it will be understood by those skilled in the art that other vacuum-responsive valve elements could be employed. For example, a spring-biased valve element might be used in place of the gravity biased ping-pong ball 34 or a flap valve might be employed. These and other suitable vacuum-responsive valve elements will be apparent to those skilled in the art, and any suitable vacuum-responsive valve element can be employed in this invention.

The above-described air vent and vacuum relief valve can be employed separately, but in the preferred embodiment, a pressure relief valve 39 is added to relieve the pressure of compressed air formed in freezing chamber 13 when door 22 is closed. For this purpose, valve housing 30 extends upwardly and has a circular valve seat 40 formed within housing 30 above air vent 26. A second opening 41 is formed at the top of valve housing 30 above valve seat 40. A second valve element such as ping-pong ball 42 is normally held in air-sealing relationship against valve seat 40 by the force of gravity. Ping-pong ball 42 fits loosely within the bore of valve housing 30 above valve seat 40, and a copper screen 44, which fits in a groove 45, closes the top of housing 30 above ping-pong ball 42. When air within freezing chamber 13 is compressed by the closing of door 22, the compressed air is communicated through air vent 26 and valve housing 30 to the bottom of ping-pong ball 42, thereby lifting the ping-pong ball 42 and allowing the compressed air to escape into the outside atmosphere. This relieves the pressure within freezing chamber 13 so that door 22 can be easily closed. The copper screen 44 prevents ping-pong ball 42 from being blown out of valve housing 30 by the above-noted compressed air.

It will be apparent to those skilled in the art that vacuum relief valve 28 and pressure relief valve 39 do not interfere with each other since a partial vacuum in air vent 26 acts to seat the pressure-responsive ball 42 more tightly against its valve seat 40, and an increase of pressure in air vent 26 acts to seat vacuum-responsive ball 34 more tightly against its valve seat 32. It will be equally apparent that warm outside air is prevented from entering freezing chamber 13 through air vent 26 in the absence of a partial vacuum condition by the gravitational force which normally presses ping-pong balls 34 and 42 against their respective valve seats 32 and 40 and forms an air seal therearound.

The gravity-biased, pressure-responsive ping-pong ball 42 can be replaced by a spring-biased valve element if desired, or a flap valve, or any other suitable pressure-responsive valve element. The pressure-responsive valve 39 may be mounted in a separate valve housing if desired, although the use of a common valve housing 30 is preferred because it simplifies the structure and reduces its cost. The air vent 26 and valve housing 30 are preferably made of a suitable plastic material such as polyvinylchloride or the like and are joined together by a suitable plastic cement.

It should be understood that the screens 36 and 44 could be replaced by other stop members such as pins or washers if desired. The function of screens 36 and 44 is simply to limit the upward movement of ping-pong balls 42 and 44, and any suitable element which performs this function can be employed.

What is claimed is:

1. In an enclosed freezing chamber having refrigerating means and having a door through which moist, atmospheric air may enter the freezing chamber, the improvement comprising an air vent extending through one wall of said freezing chamber and a vacuum relief valve in said air vent and having a valve element which is responsive to a partial vacuum condition created within the freezing chamber by the removal of moisture from moist air therein as a result of the refrigerating action, said valve element admitting air into the interior of said freezing chamber to relieve said partial vacuum, said vacuum relief valve comprising a hollow valve housing coupled to said air vent, an opening in the bottom of said valve housing communicating with the atmosphere, a valve seat within said valve housing above said opening, and a gravity-biased valve element shaped to normally rest upon said valve seat and form an air seal therearound, and said valve element being light enough to be lifted in response to said partial vacuum condition within said freezing chamber, thereby breaking said air seal and admitting air into the interior of said freezing chamber to relieve said partial vacuum.

2. The improvement defined in claim 1 wherein said valve element comprises a lightweight ball and further comprising a stop element within said valve housing above said ball to prevent the ball from being drawn into said air vent by said partial vacuum.

3. The improvement defined in claim 1 and further comprising a second opening in the top of said valve housing communicating into the atmosphere, a second valve seat within said valve housing below said second opening, and a second gravity-biased valve element shaped to normally rest upon said second valve seat and form an air seal therearound, and said second valve element being light enough to be lifted in response to an increase in air pressure within said freezing chamber, thereby breaking said air seal and relieving said increase of pressure.

4. The improvement defined in claim 3 wherein said valve elements each comprise a hollow plastic ball and further comprising stop elements within said valve housing above said balls to limit the upward movement thereof.

5. The improvement defined in claim 1 wherein said valve element comprises a lightweight ball.

6. The improvement defined in claim 5 in which there is a stop element within said valve housing above said lightweight ball to prevent the ball from being drawn into said air vent by said partial vacuum.

7. The improvement defined in claim 3 wherein said valve elements each comprise a lightweight ball.

8. The improvement defined in claim 7 wherein there is a stop element within said valve housing above each of said balls to limit the upward movement thereof.

* * * * *